United States Patent [19]

Mullins

[11] 3,850,192
[45] Nov. 26, 1974

[54] LINE TAPPING SERVICE VALVE CLAMP

[76] Inventor: John W. Mullins, P.O. Box 20524, Oklahoma City, Okla. 73120

[22] Filed: Feb. 26, 1973

[21] Appl. No.: 335,636

[52] U.S. Cl. .............................. 137/318, 285/197
[51] Int. Cl. ..................... B23b 41/08, F16e 41/04
[58] Field of Search ............ 137/317, 318; 285/197, 285/198, 199

[56] References Cited
UNITED STATES PATENTS

| 2,267,449 | 12/1941 | Eby | 137/318 UX |
| 3,030,828 | 4/1962 | Callen | 137/318 |
| 3,115,889 | 12/1963 | Franck et al | 137/318 |
| 3,450,149 | 6/1969 | Brinda | 137/318 |
| 3,509,905 | 5/1970 | Mullins | 137/318 |

Primary Examiner—William R. Cline
Assistant Examiner—David R. Matthews
Attorney, Agent, or Firm—Robert K. Rhea

[57] ABSTRACT

A cylindrical body is provided with a laterally open transverse slot intermediate its ends for receiving and nesting an intermediate portion of a line to be tapped. One end of the body is externally threaded for receiving a nut and forcing a follower into engagement with a peripheral portion of a line nested by the body slot.

In one embodiment a wall piercing tip, projecting into the body slot, is forced into the line by the nut moving the follower. A wall piercing service valve is threadedly connected with the body opposite its threaded end for communicating with the line piercing tip.

In another embodiment a wall piercing service valve is coaxially received by a threaded bore in the body at its end opposite its threaded end which pierces the wall of the line nested by the body slot.

1 Claim, 5 Drawing Figures

PATENTED NOV 26 1974        3,850,192

LINE TAPPING SERVICE VALVE CLAMP

BACKGROUND OF THE INVENTION

1. Field of the Invention

The present invention relates to refrigerant line tapping service valves and more particularly to a service valve line clamp which may be individually connected with any one of a plurality of different sizes of refrigerant lines.

2. Description of the Prior Art

Refrigeration apparatus of the closed circuit compressor-condenser-expander type presently being manufactured is usually provided with one or more service valves connected with the refrigerant lines on both the high and low sides of the compressor, however, there are numerous refrigeration systems of this type presently in use which have not been provided with a service valve for removing or adding refrigerant gas.

This invention provides a line tapping service valve clamp which is relatively small in overall size and is preferably connected with the refrigerant lines at the time of manufacture but may also be used by a repairman in connecting a service valve to a refrigerant line. One of the problems of service valves presently in use is that they are generally formed to fit a particular diameter line whereas this service valve may be individually used with any one of a plurality of different sizes of refrigerant lines and forms a permanent type vibration free clamp which either provides a line tapping function at the time of its connection with the line or provides a clamp for receiving a line piercing service valve when it is desired to provide communication with the bore of the connected refrigerant line.

SUMMARY OF THE INVENTION

An elongated cylindrical body is provided with a laterally open transverse slot intermediate its ends forming an arcuate surface or radius, adjacent one end of the body, complemental with the outside radius of the largest refrigerant line to be nested by the body slot. One end portion of the body is provided with external nut receiving threads terminating at the adjacent end of the body slot.

In one embodiment the other end portion of the body is provided with a coaxial bore forming a socket extending from the line nesting radius of the body slot toward the end of the body opposite its threaded end. The line piercing core is coaxially supported by a counterbore formed in the recess which projects from the line receiving radius surface toward the body threaded end a distance sufficient to pierce the wall of a line nested by the body slot. A lateral threaded bore is formed in the unthreaded end portion of the body defining a frangible wall between the inner limit of the lateral bore and the socket in the body for receiving a line piercing service valve which communicates with the socket. A sleeve-like follower, having transverse recesses formed in at least one of its ends, coaxially surrounds the body at its externally threaded end and is forced toward a line to be clamped by the nut.

In another embodiment the end of the body, opposite its externally threaded end is coaxially drilled and threaded for receiving the threaded end portion of a line piercing service valve. The externally threaded end portion of the body is tubular throughout its externally threaded wall area which is transversely cut to define opposite slits extending a distance at least equal to the distance between its externally threaded end and the adjacent limit of the body slot. The externally threaded end of the body coaxially receives a plug-like follower having a transverse line nesting recess in one of its ends. The plug-like follower is provided with a pair of diametrically oppositely disposed pins or prongs, slidable in the tubular portion slits which bear against the nut for forcing the plug follower into engagement with the line being clamped.

The principle object of this invention is to provide a refrigerant line clamp which may be connected with any one of a plurality of different diameter lines for receiving a line piercing service valve.

DESCRIPTION OF THE PREFERRED EMBODIMENTS

Figure 1:
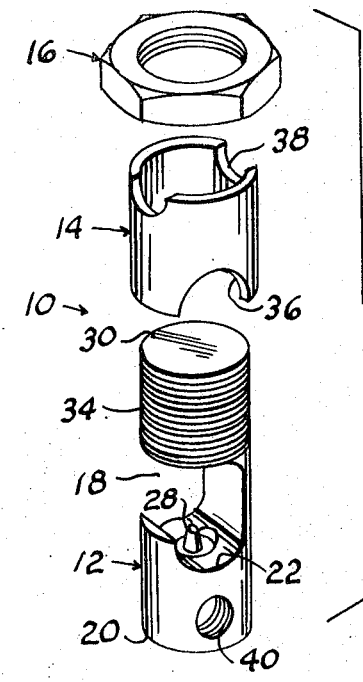
FIG. 1 is an exploded perspective view of one embodiment of the line clamp.
Figure 3:
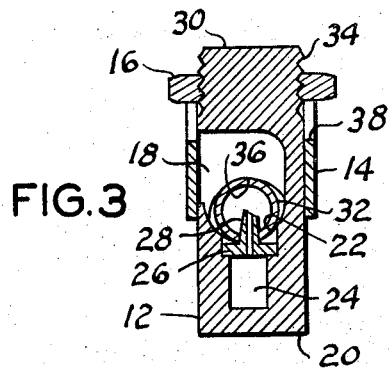
FIG. 3 is a vertical cross-sectional view taken substantially along the line 3—3 of FIG. 2.
Figure 2:
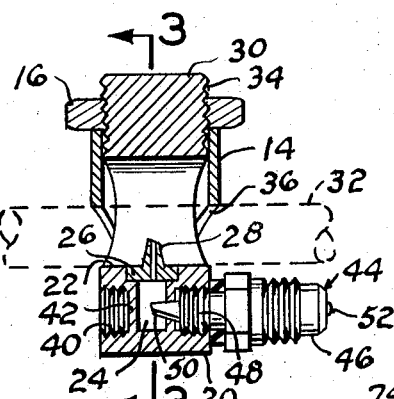
FIG. 2 is a vertical cross-sectional view of the components of FIG. 1, connected with a refrigerant line, shown by dotted lines, and illustrating a wall piercing service valve connected therewith.
Figure 4:
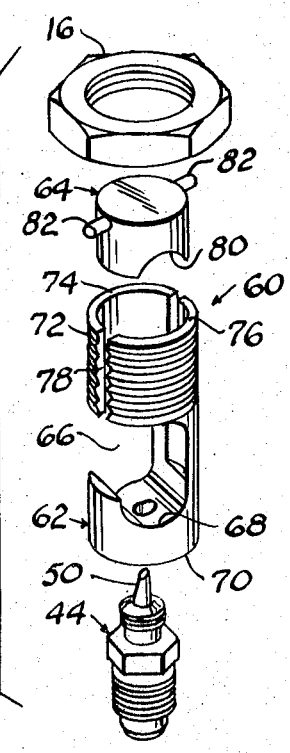
FIG. 4 is an exploded perspective view of another embodiment of the line clamp and a service valve; and, FIG. 5 is a vertical cross-sectional view similar to FIG. 3 illustrating the components of FIG. 4 connected with a refrigerant line in line piercing relation.
Figure 5:
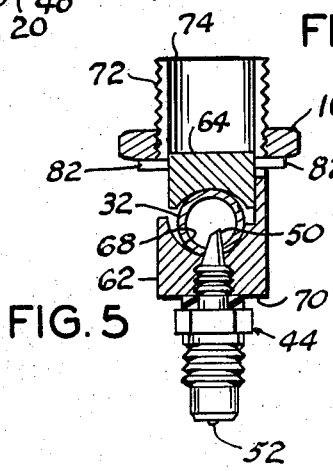

Like characters of reference designate like parts in those figures of the drawings in which they occur.

In the drawings:

The reference numeral 10 indicates the line piercing clamp members including a body 12, a sleeve or follower 14 and nut 16. The body 12 is cylindrical and is provided with a laterally open slot 18 intermediate its ends. The slot 18 is extended toward the body end 20 to form an arcuate recess 22 having a radius at least equal to the outside radius of the largest sized line to be clamped. The body 12 is centrally bored from the recess 22 toward its end 20 to form a chamber or socket 24 with the body being counterbored at the surface of the body defining the recess 22 for receiving a centrally bored line piercing member 26 terminating in a sharpened truncated conical-shaped line piercing tip 28 projecting coaxially toward the other end 30 of the body a distance at least as great as the thickness of the wall of a line 32 to be tapped. The body 12 is externally threaded, as at 34, from its end 30 a distance at least equal to the length of the body between its end 30 and the adjacent limit of the slot 18. The nut 16 threadedly engages the threads 34.

The follower 14 is sleeve-like and coaxially surrounds the body and is progressively moved from the body end 30 toward the line 32 to be tapped. One end surface of the follower is transversely grooved to provide arcuate recesses 36 formed on a radius substantially equal to the body radius 22 for engaging a peripheral portion of the refrigerant line 32 in cooperative clamping relation with the body recess 22 when forced into engagement with the line 32 by the nut 16. This forcing of the follower 14 toward the line 32 forces the line piercing tip 28 through the wall of the line 32 so that the line is in communication with the body socket 24. The other end portion of the follower 14 is preferably similarly provided with recesses 38 formed on a radius complemental with the outside radius of the smallest line to be clamped by the members 10. Obviously this is accomplished by end to end reversing of the position of the follower.

Adjacent its end 20, the body is preferably provided with at least one internally threaded lateral bore 40 terminating in close spaced relation with respect to the body socket 24 to form a relatively thin frangible wall 42. The lateral bore 40 receives a wall piercing service valve 44, such as disclosed in my U.S. Pat. No. 3,661,169, comprising a centrally bored body 46 having a threaded end 48 terminating in a line or wall piercing tip 50 with the bore of the body 46 opened and closed by an air core valve 52. The line piercing tip of this service valve 44 ruptures the frangible wall 42 and provides communication between the service valve 44 and the refrigerant line 32 through the line piercing tip 28 and housing socket 24.

The reference numeral 60 indicates an alternative embodiment of the line clamping means comprising a body 62 similar in general appearance to the body 12, a follower 64 and the nut 16. The body 62 is transversely provided with a laterally open slot 66, intermediate its ends, forming a line nesting radius 68 at one end of the slot and adjacent the end 70 of the body 62. The opposite end portion of the body is similarly externally threaded, as at 72, and the body is coaxially bored from its threaded end 74 at least coextensive with the threads to form an externally threaded tubular end portion defined by a wall 76. This wall 76 is transversely cut longitudinally to form opposite slits, as at 78, at least coextensive with the threads 72. The tubular end portion of the body coaxially receives the follower 64 which is cylindrical plug-like in general configuration having a transverse recess 80 in its end surface disposed toward the body recess 68. The follower is provided with a pair of diametrically disposed pins 82, each having a length greater than the thickness of the body wall 76 for loose sliding action in the slits 78 and contact with the nut 16 when it is threadedly moved toward the body end 70 for impinging the refrigerant line 32 to be tapped. The end 70 of the body is coaxially bored through the recess 68 and internally threaded for receiving one of the service valves 44 so that its line piercing tip 50 penetrates the wall of the refrigerant line 32.

Obviously the invention is susceptible to changes or alterations without defeating its practicability, therefore, I do not wish to be confined to the preferred embodiment shown in the drawings and described herein.

I claim:

1. A tubular line clamp, comprising:

a cylindrical body having external threads at one end portion and having a laterally open slot intermediate its ends forming an arcuate line nesting recess facing toward its threaded end portion;

a nut threadedly engaging said external threads;

a follower comprising a sleeve surrounding the externally threaded end portion of said body and movable toward the other end of said body by said nut, said follower having a transverse recess in at least one of its end surfaces and cooperating with the body recess in gripping an intermediate portion of a line, said body being coaxially bored from its body nesting recess surface to form a socket, said body being counterbored coaxial with the socket, a centrally bored line piercing tip within the counterbore communicating with the socket and projecting, coaxial with said body from the surface of the arcuate line nesting recess, a distance greater than the thickness of the wall of a line to be pierced, said body having a lateral service valve receiving bore formed on an axis normal to the axis of the socket and terminating inwardly of the surface of the body in close spaced relation with respect to the body surface defining the perimeter of the socket and forming a frangible wall between the inward limit of the lateral bore and the socket; and, a service valve having an end portion disposed within the lateral bore and having a wall piercing tip movable toward the frangible wall.

* * * * *